INVENTOR.
FRED H. ELDRED

3,121,635
METHOD OF MAKING SOLUBLE COFFEE TABLETS

Fred H. Eldred, Fallbrook, Calif., assignor, by mesne assignments, to Western Instant Products, Inc., San Francisco, Calif., a corporation of California
Filed Apr. 13, 1961, Ser. No. 102,896
11 Claims. (Cl. 99—66)

This invention relates to tablets formed of water soluble extractives of roasted and ground coffee and to a method of preparing the same. It is a continuation-in-part of United States patent applications Serial Nos. 642,184 and 734,451, filed February 25, 1957, and May 8, 1958, now abandoned.

In recent years the market for soluble coffee extractives, sold in powdered form, has become a large proportion of the entire coffee sales. The convenience and speed of preparation of the coffee beverage from these so-called "instant" coffees has led to their regular use by many families as well as use in domestic emergencies even in many families that ordinarily brew their coffee from the ground product in more conventional fashion.

Numerous patents have been issued in the past showing various ways of preparing tablets of ground or crushed coffee, including the insoluble portion of the coffee bean as well as the soluble ones. Certain of these prior patents show the use of various binders to hold the tablets together; others have shown that under extremely high pressures the extractive squeezed from the granules will cause them to adhere. It might therefore appear that it would be simple to compress these same extractives, after first leaching them from the coffee beans, to form tablets of "instant" coffee without grounds.

This does not, in fact, prove to be the case. Powdered coffee extractives have been prepared with particles of various kinds. At present, however, substantially all of the commercially-offered soluble coffees are composed of particles in the form of tiny hollow bubbles, many exhibiting blow-holes. The preparation of commercially available "instant" coffees is described in a number of publications including U.S. patents. Whatever their form, if sufficient pressure is applied to the particles to make them adhere and form a tablet that is sufficiently solid to be handled, the resultant cake becomes so dense that it takes minutes instead of seconds to dissolve and the major advantage of quick preparation is lost. If an attempt is made to brew a cup of coffee from a tablet of this character in the usual manner, by pouring boiling water over it in a cup, it requires so much stirring that the brew is too cool for many tastes before solution is complete. The use of extrinsic binders is also undesirable, resulting in a beverage that contains extraneous ingredients other than the pure coffee extractives.

According to the present invention, tablets from powdered coffee extractives, with nothing added, that are sufficiently solid to be easily handled but which will, nonetheless, dissolve as readily or even more readily than the same extractives in powdered form are provided. The tablet formed, powdered extract of coffee can be packaged and shipped in containers of light weight and small volume in comparison with the weight and volume of the product packed, instead of requiring glass or other jars that frequently weigh considerably more than the product they contain and are wasteful of storage space. The tablet form coffee extractives are provided by a tablet forming method that uses well-known and readily obtainable apparatus and material, that is clean and easily operable, (the material from which the tablets are formed not tending to gum or clog the equipment), and that is economical in its performance. Another feature of this invention is the production of soluble coffee tablets having a superior, fresh coffee flavor.

The methods of preparing the powdered coffee comprising the pure extractives are now rather widely known. The process of the present invention starts with the pure powdered coffee of this character, with particles in the form of hollow, quasi-spherical bubbles or globules. Except when specifically stated otherwise, "coffee powder," in this specification means soluble coffee extractives in this form. The addition of a small amount of water converts such coffee powder to a tarry mass. At times, if the powder is placed in a cup and water poured on top of it, without immediate stirring, the surface layers will form such a mass, the particles coalescing to form a sticky, very slowly soluble coat over an inner core of dry powder so that if the liquid is later stirred there is difficulty in getting the entire quantity of powdered coffee into solution. Water in sufficient amounts to initiate the dissolution, therefore, is not a desirable binder, for if pressure is applied to a water-moistened mass of powder it forms the same type of solid cake as does the powder when subjected to pressure alone. In accordance with this invention it has been found that the addition of water in small amounts to be subsequently described, to the coffee extract merely dampen the particles, make them sufficiently aglutinous and permit their agglomeration into readily soluble tablets which will retain their tablet-form under normal conditions of handling.

Figure 1:
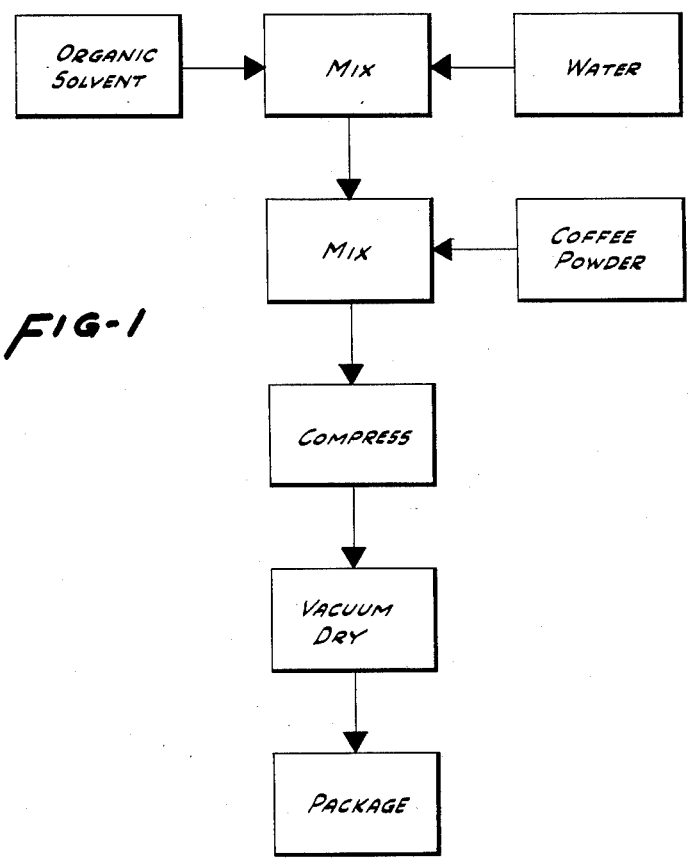
FIG. 1 is a flow sheet showing the various steps in the formation of the coffee tablets of this invention.
Figure 2:
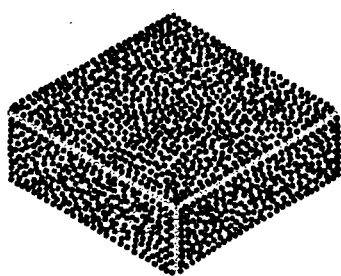
FIG. 2 shows a preferred form of tablet as it leaves the press.
Figure 3:
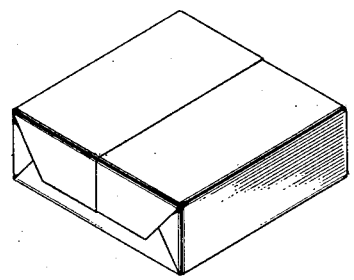
FIG. 3 shows such a tablet, individually wrapped and ready to be packed for shipment.

In carrying out the present invention the powdered coffee is mixed with a small amount of water, preferably dissolved in a liquid vehicle in which the particles are only very slightly soluble, if soluble at all. Illustrative vehicles include conventional organic solvents, i.e., low boiling alcohols or ketones which are completely miscible with water. Enough water or water-containing vehicle is added to the powder to make is slightly damp, so that it can be molded in the fingers as damp sand can be, but retains its particulate nature. The mass thus formed is pressed into tablets under pressure of the order of magnitude of 50 pounds per square inch, whereafter the tablets, although friable can readily be handled without crumbling. The tablets are then desiccated, preferably by heat such as infra red. Desiccation in vacuo, with or without heating until all of the added water and vehicle are evaporated can also be used. After the tablets have been dried an examination of the broken edge of a tablet will show it to be uniformly dry.

The evaporation of the water (and solvent, if used), leaves a firm, porous tablet, having a density materially less than unity. Placed in a cup of near-boiling water it disintegrates rapidly and, if stirred, will dissolve completely in less than 10 seconds; even without stirring dissolution is practically complete within 30 seconds. Preferably, the tablets each contain approximately 2.2 grams of the original powdered extractives, this being the average amount used per cup, but the actual weight of the tablets formed in a matter of choice. The shape also is a matter of individual choice and judgment; but at the present, the preferred dimensions are approximately ⅞ inch square and ¼ inch thick, since this gives a tablet that is thick enough to be resistant to fracture and at the same time offers a relatively large ratio of surface to volume so that the water penetrates easily and quickly. The tablets can be individually wrapped in moisture-resistant material and packed in rectangular cardboard boxes, the dimensions of which are substantially multiples of one inch, which offers an advantage in shipment and storage space. Thus packed, the package containing six ounces of the soluble coffee (one of the standard sizes) weighs only about 7 ounces, as compared with an average of one pound for the same amount of coffee packed in the customary glass jar. In storage space, a package containing 80 tablets of a net weight of just a little over 6 ounces occupies only twenty cubic inches in comparison to a little over 60 cubic inches for the glass jar 6-ounce package.

In selecting the materials utilized in the process of forming the tablets of this invention, the powdered soluble coffee is preferably the product resulting from any of the presently used processes, with individual particles in the form of hollow aeriform globules. In addition to being the most readily available this form tends to go into solutions faster and is therefore much to be preferred; although the process can be used with coffee in the form of solid particles the product is not as desirable. Although throughout the description of this invention the coffee particles are described as "water-soluble" coffee extract, this expression is used for convenience because the coffee particles when reconstituted with water form a coffee brew which is a colloidal suspension or colloidal solution.

Sufficient amounts of added water are employed to dampen the instant coffee particles rendering them aglutinous without initiating the reconstituting of a liquid coffee extract. Preferably the amount of added water employed can be determined experimentally and will depend upon a number of factors including the amount of residual water remaining in the coffee extract particles after they have been prepared for bulk packaging. This may be only about 0.1–0.2 wt. percent. Accordingly, 1–2% by weight of added water, based upon the amount of coffee used is sufficient to effectuate the objectives of this invention; however, amounts outside this range may be necessary in certain instances.

The water is added under conditions such that the water is distributed uniformly over the surface of the coffee extract particles. A number of techniques can be used for incorporating the water. For example (1) controlled exposure of soluble coffee particles to an atmosphere saturated with water vapor or containing an accurately controlled percentage of saturation. The coffee particles could uniformly adsorb the required amounts of water by freely falling down a column in which the desired atmosphere is maintained. (2) Addition of water in small droplets to soluble coffee undergoing rapid mixing, as for example, in a screw conveyor. (3) Atomizing water or blowing steam on to soluble coffee which was being violently mixed. (4) Wetting with more than sufficient water, then drying to a moisture content which will produce good tablets.

To facilitate the control of the water addition it is preferred, however, to incorporate the water in a liquid vehicle.

A number of vehicles in which the water is mixed can be employed. The selected vehicle should have a low boiling point and be quite volatile, so that it can be easily removed by evaporation during the drying operation; the coffee extractives should be insoluble in it or very nearly so, and it should be completely miscible with water and non-toxic. These requirements are best met by a group of the so-called organic solvents, comprising the lower boiling alcohols and ketones. Ethyl alcohol, or either of the two propyl alcohols are satisfactory. Primary or secondary butyl alcohols are also possible but not to be preferred; they have higher boiling points than the lower alcohols and more powerful and less pleasant odors, and are also more toxic than the intermediate alcohols.

Among the ketones, acetone would be the material of choice, although methyl ethyl ketone is possible. It is evident that other vehicles can also be used in carrying out the invention.

In using a vehicle for the controlled addition of water, a small amount of water is added thereto. The amount of water varies inversely with the degree of solubility of the powdered coffee in the solvent. No matter which solvent is used the percentage of water should not exceed 25% by volume of the vehicle. Because of their ready availability and relative non-toxicity ethyl alcohol or isopropyl alcohol are the preferred solvents. In using ethyl alcohol the preferred proportion of water is about 5%, although the process is possible with as little as 3% of water or as much as 25% with either of these two materials. With acetone, the proportion of water required for best operation is lower; pure acetone is not satisfactory, but over fifteen percent of water tends to make the mixture of powder and water too gummy to handle. The preferred percentage of water with an acetone solvent is lower and the usable range is between about 1 percent and 15 percent.

The coffee powder and the water or water-containing vehicle are mixed to form a still powdery but slightly dampened mass. The water or water-containing vehicle is added gradually while continually stirring the powder. If a vehicle is used to introduce the water, because of the volatility of the vehicle, the process should be carried on in an enclosed mixer, in which case the water-containing vehicle can be sprayed while the mixing is being carried on. When the mixing is complete, the material still retains something of its powdery consistency, but it should be damp enough to retain its form when molded between the fingers, as will damp sand, without being gummy or closely adherent. Using a vehicle of 85% ethyl alcohol and 15% water, the best proportions of liquid and powder are approximately one liter of liquid to 11 kilograms of powder, or, translated to English weights and measures, approximately 0.5 quart liquid to 11 pounds of powder. If the vehicle contains a smaller percentage of water the quantity of vehicle should be increased; the volume of vehicle used varies nearly in inverse proportion to the percentage of water it carries. The amount of water or water-containing vehicle used should not exceed that which is fully absorbed by the powder, so that it forms a film coating the individual coffee extract grains that cannot be expressed from the mass by the pressure used in forming the tablet.

As soon as the mixing of powder and water or water-containing vehicle are complete the mass is molded into tablets, in a press of any of the various types that have been devised for such purposes. Hydraulic presses are convenient because they permit accurate control of the pressure applied, but mechanical presses can also be used as the decrease in volume of the compressed mass is a function of pressure; a fixed volume (or weight) of charge in each cavity of a mold, when compressed to the proper dimension, will have had the proper pressure applied. If the proportions of liquid and powder have been correctly chosen, the damp mass will not adhere or tend to gather on the parts of the press. The method of feeding the powder into the press will depend upon its construction; a quantity can, for example, be spread over a multicavity mold, the excess scraped off of the top so that each mold holds the desired amount, after which the rams descend to compress the powder into tablets of the desired proportion.

The necessary pressure to accomplish this is in the neighborhood of 50 pounds per square inch, when a 15% water in alcohol vehicle is used, but it depends in a large degree upon the amount of water in the vehicle; an excess of water over the optimum 15% requires a lower pressure to make a firmly adherent tablet or a lower percentage of water requires an increase in pressure, the pressure required varying substantially inversely as the percentage of water. An inverse general rule holds as regards the total amount of vehicle in the mixture; a greater amount of liquid is required with lower percentages of water and hence requires higher pressure. The most effective pressure is best determined experimentally. In most cases, the required pressure is in the range from 25 to 200 pounds per square inch, and preferably 80–100 lbs. per sq. in.

As in all molding processes, the dies in which the tablets are molded should be smooth and highly polished or suitably coated, for example, with Teflon [1] to prevent sticking. As the material to be handled is a food product it is not desirable to use ordinary lubricants which might cause contamination, although a very thin film of one of the highly purified paraffin oils would not be deleterious. It is better to treat the surfaces of the cavities and rams with one of the silicones that forms a tightly adherent, hydrophobic surface, if any lubricant whatsoever is to be used, but with polished cavities and rams no lubrication or anti-wetting agent is really necessary.

The powder is hygroscopic and will absorb water. Moreover, the rate of absorption appears to be accelerated by pressure. The amount of water in the film adhering to each particle should be sufficient to soften the surface layers only, causing them to adhere under pressure, but not enough to soften the entire particle. The pressure both facilitates the absorption and causes the adhesion. If there is too much water in the vehicle, contact with the merest film will soften the particles throughout causing them to rupture and coalesce without pressure and form an unmanageable, non-porous mass. Even before this occurs, however, percentage of water above the optimum will penetrate the surface of hollow particles of coffee more deeply than is necessary to cause adhesion, weakening their walls so that they collapse under very slight pressure.

If a vehicle is used, solubility of the coffee extract particles in the vehicle and absorption and softening of the particles by it appear to be in some degree reciprocal; the extract is very slightly soluble in acetone, but not sufficiently so to make a good tablet with the amount that the powder will absorb. Only about one-half as much water is needed in an acetone vehicle as in alcohol to give the same degree of softening and adherence. The water is necessary, however, for the slight solubility of the powder in the pure solvent cannot be compensated by increasing the amount of vehicle. So much would be required that the powder will no longer absorb it completely and it will be expressed under pressure. The expressed vehicle always will contain some small amount of coffee and therefore the expressed liquid is not only wasted but on evaporation it leaves a sticky coating that requires constant cleaning of the solvent recovery equipment, if used.

The pressure need be applied only momentarily to cause such adherence and form a tablet that is too friable to stand shipping, but which can easily be handled for transfer from the press to drying racks. In this stage of the operation the tablets are materially darker in color than either the coffee powder or ordinary ground coffee, being somewhere in shade between ground coffee and a dark chocolate brown.

Conventional drying techniques are used after the tablet making step. Ordinary ovens wherein the tablets are placed on trays and maintained at a temperature of about 215° F. can be used, for example, when a solution of 5% water–95% ethyl alcohol is employed to dampen the coffee particles. To facilitate the drying operation infra red drying is preferred alone or in combination with vacuum drying. Other drying techniques such as electrically or steam heated chambers can also be used. The temperatures as applied within the chamber are preferably materially lower than the boiling point of water in order to avoid melting of the more fusible portions of the coffee extractives and prevent any possible "cooking," change in composition, or loss of volatile components. No heating above room temperatures is really necessary, but the whole process is expedited by the application of heat to less-than-boiling temperature under atmospheric pressure. Empirically, if a combination heat-vacuum drying system is used, a temperature of 60° C. (140° F.) and a vacuum equivalent to 30 inches of mercury appear to give the greatest overall economy, but the temperature and vacuum applied are not critical and in a different installation the most economical range could quite possibly prove to be anywhere between boiling temperature and ordinary room temperature and a vacuum of 15–30 inches of mercury. The question of temperature used is an economic one, in which time of evacuation is balanced against cost of heating and evacuation.

The vapors drawn off from the tablets in the drying process are thereafter preferably recovered and treated in a solvent recovery process so that the vehicle can be recovered for reuse. The water content of the final tablets is substantially the same as that of the initial powder; therefore, the recovered vehicle after condensation has very nearly the same water content as that used in forming the original mixture. The drying process is continued until the water and vehicle originally added to the powder has been completely evaporated. This can be determined in several ways: in practice the tables will be put through a time cycle known degree of vacuum and temperature; at 60° C. and 30 inches of vacuum the time required is in the neighborhood of one-half hour for tablets of the size and shape herein described. Complete evaporation of the vehicle can be determined by weighing the tablets but by far the most sensitive method of determining whether evaporation is complete when a vehicle is employed, is by odor. All of the suitable vehicles have an odor and an acute sense of smell will detect remnants of solvent that could be discovered in no other fashion, even though the vehicle odor is masked under the odor of the coffee. A uniform appearance of the broken edge of tablets is also an indication of complete drying. Once the processing cycle has been determined individual testing is usually superfluous, for if anything has gone wrong and evaporation is incomplete, the odor is immediate warning. By weight, taste and smell, the tablet form product has the same composition as the original coffee extract powder.

The resulting tablets are hard and firm. Tablet strength can be determined in a number of ways. In one test of tablet strength, coffee tablets were prepared in accordance with this invention through the use of 2.7 cc. of a solution of 95% ethanol and 5% water per 10 grams of coffee (1.35% of added water), as described above. These tablets represented a reasonable combination of firmness and excellent solubility. Tests were made with a Carver hydraulic press, with tablets placed horizontally between smooth pieces of tempered hardboard, e.g., Masonite hardboard. In six tests, tablets remained unaffected to gauge pressures between 140 and 160 pounds per square inch, the tablet crumbling to a powder abruptly at its particular breaking point. The tablets tested were ⅞ inch square and a little over ¼ inch thick. The tablets can be broken between the fingers with about the same degree of difficulty as a lump of sugar in tablet or "domino" form. A distinguishing characteristic is their very high degree of porosity; the evaporation of the vehicle from the interstices between the coffee globules leaves passages that penetrate to the center of the tablets which consist of the original spheroids, closely packed but adherent only at their points of tangency. Moreover, the spheroids are themselves very thin films into which the water need not penetrate deeply to dissolve them.

Using the materials, proportion of vehicle and pressure here described, the density of the tablets is approximately 0.5 to 0.7 gram per cc. (or, stated differently, the volume is between 1.4 and 2 cc. per gram). Either dropped into boiling water or having hot water poured upon them,

---

[1] A polytetrafluoroethylene plastic marketed by E. I. du Pont de Nemours & Co.

they float and are thus exposed to the hot liquid from all sides so that there is no tendency to sink to the bottom of the cup. They are, however, highly absorbent and quickly absorb enough water so that they sink to surface level and, in the final stage of their dissolution, become practically of the same density as the solution itself. They disintegrate very rapidly with any stirring at all; in from six to ten seconds, depending upon the temperature of the water. Without stirring they will go into solution in from one-half to one minute. If boiling water is poured in on top of the tablet the turbulence is sufficient so that the solution is practically complete by the time the cup is filled.

In the final step, the coffee tablets, formed as described, are preferably individually wrapped. Wrapping machinery such as is in common use for wrapping bouillon cubes, caramels or lump sugar is satisfactory for this purpose. Preferably the wrapping should be water and vapor proof; e.g., a wax paper such as can be sealed by a slight application of heat. This excludes moisture and air so that the product does not deteriorate under long storage.

It is quite possible, of course, to prevent oxidation and absorption of moisture without individual wrapping by lining the box in which many tablets are packed within moisture-resistant paper, film or foil. As has been stated, the powdered coffee itself is somewhat hygroscopic; the tablets are equally but not more so. Exposed to air of only average humidity the tablets will remain in good condition for days or weeks. Under conditions of very high humidity, as in a tropical or foggy climate, they will, if exposed to the air, absorb moisture, become darker in color and sticky to the touch and will collapse to perhaps three-quarters of their original volume. This makes them more difficult to dissolve and less pleasant to handle but has no effect up the quality of beverage coffee prepared from them.

Although the subject invention has been described with reference to a complete specific embodiment there are many variations and modifications which can be made without departing from the scope of this invention.

In the preceding description the proportions have been given in terms of total volume of vehicle and percentage of water contained in it, principally because the amount of vehicle that can be absorbed by the powder varies little with the vehicle used while the amount necessary to obtain the best results varies widely as between the alcohols and the ketones. Translating the figures given into terms of water content, using an alcoholic vehicle the limits of practical operation are from 10 cc. to 20 cc. of water per kilogram of coffee extract particles. One satisfactory tablet was prepared employing 3.5 cc. of a 95% ethyl alcohol–5% water per 10 grams of soluble coffee as the tableting agent (corresponding to 17.5 cc. of water per kilogram of coffee extract). In a ketone vehicle, the amount of water required is approximately half of that in alcohol, although the range is slightly greater; it varies between a minimum of 5 cc. per kilogram of coffee to about 20 cc. per kilogram of coffee. Within the limits specified the alcohols and ketones are substantial equivalents, requiring approximately the same consolidating pressures.

Naturally, the various limits given are somewhat interdependent. As the limits are approached, the process becomes more critical and waste is more likely to occur, owing to slight deviations from the intended values. The preferred proportions are arrived at as being those that will ordinarily give the greatest economy of operation, considering both labor and material. If a vehicle is used, an amount of vehicle nearer the upper than the lower limit results in a smaller percentage of energy to be expended in evaporating the solvent, and a smaller amount of solvent required, as well as less likelihood of wasting it through expressing it in the formation of the tablets. On the other hand, the vehicle resulting from using the favored proportions is not so good a solvent as to lead to the formation of gummy masses within the mixture in case it is added a little too quickly with an insufficient stirring. At the same time, using the preferred vehicles the quantity required is sufficiently great to coat all of the particles without collapsing them.

From the point of view of economy alone an acetone base vehicle is preferable to one having an alcohol base, since it is itself more volatile and requires less water, (which must be also evaporated) and therefore the cost of the desiccation is less. At the present, however, alcohol is preferred because of its acceptability in food products by the general public, particularly where it is substantially all evaporated in processing the food, as, for instance, in flavoring extracts or as a byproduct in the leavening of bread. Except for such largely psychological factors there is no outstanding advantage to ethyl alcohol in comparison to the ketone.

To incorporate flavor in the tablets of this invention, the flavor is extracted from freshly ground, roasted, coffee beans, e.g., by means of a suitable solvent, and such flavor is added to the tablet making agent, e.g., water, or water-containing vehicle to be used in the production of coffee extract tablets. By "flavor," I mean those constituents that impart to the fresh coffee its characteristic and pleasing odor and taste. As is more fully explained above the tablet making agent consists essentially of water or water admixed with a suitable volatile organic solvent, which is added to dry, powdered soluble coffee in amounts sufficient to produce a damp, non-cohesive powder. The damp powder is molded into tablets under sufficient pressure to form friable, porous cakes, which must then be dried to remove the solvent and leave porous, fast-dissolving tablets of particles of pure coffee extract. Drying of the flavor impregnated tablets is accomplished as described above, as, for example, drying at substantially atmospheric pressure by exposing the tablets to infra-red light, whereby substantially complete removal of the solvent is achieved while the major portion of the flavor remains within the tablets.

This feature may be better understood from the following detailed description of specific examples.

Example I

About 15 cubic centimeters of ethyl ether is run through, or preferably agitated with, about 3.6 grams of freshly ground, roasted coffee beans. The flavor of the coffee (together with certain oils which are not of present consequence) dissolve in the ether to form an infusion containing said flavor. This infusion is heated to about body temperature to evaporate and draw off the ether, after which there remains a dark, heavy oil, or concentrate, which includes the coffee flavor. Warm air may be blown over or through this oil to remove the last trace of ether. After extraction of the flavor therefrom, the ground coffee can be used to make "instant" soluble coffee powder, and is as good as untreated coffee for this purpose since flavor is always lost in the course of making soluble coffee powder.

The aforesaid oil, containing the coffee flavor, is dissolved in a vehicle consisting essentially of isopropyl alcohol diluted with water in the proportion of 90% alcohol to 10% water by volume. This vehicle, with said flavor therein, is then added to about 20 grams of dry powdered, soluble coffee, similar to the "instant" coffee that is in widespread use at the present time. A sufficient amount of the vehicle is employed that, upon adding the vehicle to the dry coffee powder, a damp but non-cohesive powder is formed. This damp powder is then molded into tablets of appropriate size under sufficient pressure to form friable, porous cakes, wherein the particles of powder adhere at their points of tangency without being crushed into a dense mass.

Next, the tablets are dried by exposure to infra-red light at atmospheric pressure for about fifteen or twenty minutes. The infra-red light may be supplied by an ordinary infra-red lamp, or a bank of such lamps, positioned a foot or so above a single layer of the tablets disposed on a screen for warming the tablets without heating them to an excessive temperature. One can place his hand under the lamps next to the tablets without discomfort. At this relatively low temperature, and at substantially atmospheric pressure, the isopropyl alcohol is evaporated and substantially completely removed from the coffee tablets, so that the end product is, for all practical purposes, pure coffee.

However, when treated in this way, the major portion of the flavor extracted from the ground coffee bean remains in the coffee tablets, and coffee made by dissolving such tablets in water has a flavor matching that of coffee freshly brewed from freshly ground, roasted, coffee beans. Of course, the coffee tablet should be protected from the atmosphere—e.g., by enclosing each tablet in an impervious wrapping—between the completion of the manufacturing process and use of the tablet. Also, a small quantity of anti-oxidant (not over one-hundredth of one percent) may be included in the coffee tablets to help preserve the flavor. For example, one suitable anti-oxidant is butylated hydroxytoluene, sold by the Tennessee Eastman Company as "BHT" and by the Shell Chemical Company as "Ionol." The anti-oxidant may conveniently be added to the solvent used for extracting the flavor from the ground coffee beans.

*Example II*

About 15 cubic centimeters of isopropyl alcohol, either pure or diluted with water, is run through, or preferably is agitated with, about 3.6 grams of freshly ground, roasted, coffee beans. The coffee flavor dissolves in the alcohol to form an infusion containing the coffee flavor. Additional isopropyl alcohol and water may be added, as required, to form the requisite amount of vehicle for treating 20 grams of dry, soluble, powdered coffee as explained in the preceding Example I. In this instance, the solvent used to extract the flavor from the ground coffee is merely the solvent, or a portion thereof, used as a vehicle for making the tablet, and therefore the intermediate step of heating to evaporate the first solvent, as described in Example I, is not required in the process according to this Example II. The process now proceeds as described in the foregoing Example I.

Various substitutions may be made in the solvents employed for both examples. For instance, in the process according to the foregoing Example I, the ethyl ether employed as a solvent for extracting the coffee flavor may be replaced by various other solvents such as acetone, carbon tetrachloride, chloroform, etc. The solvent employed must be quite volatile, since it is necessary to evaporate and drive off the solvent at a low temperature that will not evaporate and drive off the extracted flavor.

In both of the foregoing Examples I and II, the isopropyl alcohol may be replaced by other volatile organic solvents as hereinbefore described. At present, ethyl alcohol is the preferred solvent, and isopropyl alcohol is the next in line of preference.

It is evident, therefore, that if a solvent is selected which also functions as a vehicle for water used in the tableting operation the material selected will be multi-functional. Furthermore, the water required can be added initially before the flavor-extracting step in order to facilitate the tableting operation.

Although the instant invention has been described with reference to a number of illustrative embodiments variations and modifications can be made without departing from the scope of this invention. It should be understood that this invention in its broader aspects is not limited to the specific examples herein described. The scope of the invention is defined by the following claims.

What is claimed is:

1. A method for making readily water-soluble tablets from finely divided, water-extracted coffee bean extract particles, said method comprising:

moistening a mass of substantially dry, finely divided, water-extracted coffee extract particles with water in excess of about 0.1 wt. percent, based upon the weight of said extract particles, to produce a mass of damp but non-cohesive particles;

molding said moistened mass of particles under sufficient pressure, within the range of about 25–200 pounds per square inch, to cause said particles to adhere and form a coherent friable tablet;

and desiccating the resultant tablet to substantially completely remove the moisture therefrom.

2. A method as recited in claim 1 wherein said particles are moistened with 1–2 wt. percent water.

3. A method as recited in claim 1 wherein:

said water is admixed, in a liquid vehicle, with a non-toxic volatile organic solvent selected from the group consisting of lower molecular weight alcohols and ketones which are substantially completely miscible with said water, said solvent being one in which finely divided, water-extracted coffee extract particles are substantially insoluble;

and said solvent is volatilized in the course of removing said moisture from said tablet.

4. A method as recited in claim 3 wherein said water constitutes no greater than 25 vol. percent of said liquid vehicle.

5. A method as recited in claim 4 wherein said solvent is ethyl alcohol.

6. A method as recited in claim 4 wherein the ratio of said water to said coffee extract particles is less than 20 cc. of water per kilogram of coffee extract particles.

7. A method as recited in claim 6 wherein said solvent and said water are substantially completely removed from said tablet by desiccating under vacuum.

8. A method of making soluble coffee tablets having a fresh coffee flavor, said method comprising:

solvent-extracting flavor constituents from ground roasted coffee beans employing a non-toxic volatile solvent selected from the group consisting of water and a non-toxic volatile organic solvent selected from the group consisting of lower molecular weight alcohols and ketones which are substantially completely miscible with water in liquid vehicles containing up to 25 vol. percent water, said organic solvent being one in which finely divided, water-extracted coffee bean extract particles are substantially insoluble and one which is capable of extracting flavor constituents from said coffee beans;

said solvent being employed in sufficient amount to extract a substantial portion of said flavor constituents to provide a flavor-containing solvent;

adding water, in a form selected from the group consisting of said flavor-containing water and said flavor-containing organic solvent admixed with water in a water-containing vehicle having no greater than 25 vol. percent water, to finely divided, water-extracted coffee bean extract particles to moisten said particles;

said water being added in an amount exceeding 0.1 wt. percent based upon the weight of said extract particles, to produce a mass of damp but non-cohesive particles;

molding said moistened mass of particles under sufficient pressure, within the range of about 25–200 pounds per square inch, to cause said particles to adhere and form a coherent friable tablet;

and desiccating the resultant tablet to substantially completely remove said solvent from said tablet without affecting the substantial removal of said flavor constituents therefrom.

9. A method as recited in claim 8 wherein said tablets are desiccated by exposure to infra-red light at substantially atmospheric pressure.

10. A method of making soluble coffee tablets having a fresh coffee flavor, said method comprising:

solvent-extracting flavor constituents from ground roasted coffee beans employing a non-toxic volatile first solvent, capable of extracting the flavor constituents from said coffee, to provide a first solvent containing said flavor constituents;

evaporating said volatile first solvent, following said extraction, to obtain a concentrate containing said flavor constituents;

combining said concentrate with a second solvent selected from the group consisting of water and a water-containing vehicle having up to 25 vol. percent water admixed with a non-toxic volatile organic solvent selected from the group consisting of lower molecular weight alcohols and ketones which are substantially completely miscible with said water in said vehicle and in which finely divided, water-extracted coffee extract particles are substantially insoluble;

adding water, in the form of said flavor concentrate-containing second solvent, to finely divided, water-extracted coffee extract particles to moisten said particles;

said water being added in an amount exceeding 0.1 wt. percent, based upon the weight of said extract particles, to produce a mass of damp but non-cohesive particles;

molding said moistened mass of particles under sufficient pressure, within the range of about 25–200 pounds per square inch, to cause said particles to adhere and form a coherent friable tablet;

and desiccating the resultant tablet to substantially completely remove said solvent from said tablet without affecting the substantial removal of said flavor constituents therefrom.

11. A method as recited in claim 10 wherein said first solvent is ethyl alcohol.

References Cited in the file of this patent

UNITED STATES PATENTS

| | | |
|---|---|---|
| 1,271,761 | Phillips | July 9, 1918 |
| 1,365,443 | Anhaltzer | Jan. 11, 1921 |
| 1,367,725 | Trigg | Feb. 8, 1921 |
| 2,345,378 | Brandt | Mar. 28, 1944 |
| 2,419,875 | Birdseye | Apr. 29, 1947 |
| 2,481,470 | Cohen | Sept. 6, 1949 |
| 2,897,084 | Peebles | July 28, 1959 |